United States Patent Office 3,126,379
Patented Mar. 24, 1964

3,126,379
ESTER OF 1-METHYL-3-(HYDROXYETHOXY) PIPERIDINE
Martin A. Davis, Montreal, Quebec, Canada, assignor to American Home Products Corporation, New York, N.Y., a corporation of Delaware
No Drawing. Filed Oct. 2, 1961, Ser. No. 141,997
4 Claims. (Cl. 260—243)

This invention relates to a new chemical compound, an ester of a substituted piperidinoxy-ethanol, and to its preparation from readily available starting materials.

More particularly, my invention relates to the phenothiazine-10-carboxylic acid ester of 1-methyl-3-(2'-hydroxyethoxy)piperidine and to the process by which this new chemical compound may be prepared. Since the salts of this compound are pharmacologically equivalent to the base itself, my invention is also concerned with various salts of this new ester, herein sometimes referred to as the base, or as the basic ester, more particularly the quaternary ammonium salts of the base formed by the addition to the basic ester of lower alkyl esters of inorganic acids, such as lower alkyl halides, sulfates and nitrates, and to its acid addition salts which pharmaceutically acceptable acids. Examples of these are the methobromide and hydrochloride salts of the new basic ester.

The basic ester of this invention, 1-methyl-3-(2'-hydroxyethoxy)piperidine phenothiazine-10-carboxylate, which may also be termed 2-[3-(1-methylpiperidinoxy)] ethyl phenothiazine-10-carboxylate, may be represented by the structural formula:

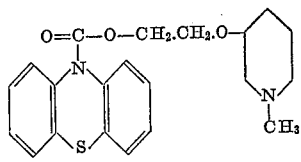

The compound may be readily prepared by condensation of phenothiazine-10-carboxylic acid chloride with 1-methyl-3-(hydroxyethoxy)piperidine in the presence of an acid binding agent such as pyridine. This substituted piperidine reagent may also be termed 2-[3-(1-methylpiperidinoxy)]ethanol.

The new compounds with which this invention is concerned have valuable pharmacological properties. They are useful as antitussive agents and as local anesthetics. They are characterized by a low order of toxicity and a fair degree of anticholinergic activity.

As local anesthetics the new basic ester is preferably employed in the form of one of its water-soluble salts for topical application in 1-2 percent aqueous solutions. For antitussive use it may be orally administered as one of its water-soluble salts in solid dosage forms, such as tablets or capsules containing an excipient, for example lactose, a disintegrating agent, for example starch, and a lubricant, for example magnesium stearate. It may also be administered in liquid preparations such as syrups which may advantageously contain expectorant and secretolytic additives. Usual dosage forms may advantageously contain from 10 milligrams to 50 milligrams of the active compound per dosage unit.

The starting materials utilized in preparing my new basic ester and its acid addition and quaternary ammonium salts are easily obtainable or readily prepared. Thus, the intermediate alcohol, 2-[3-(1-methylpiperidinoxy)]ethanol, which may also be termed 1-methyl-3-(hydroxyethoxy)piperidine, may be prepared by the alkali-catalyzed addition of ethylene oxide to 1-methyl-3-hydroxypiperidine. Phenothiazine-10-carboxylic acid chloride may be conveniently prepared by mixing solutions of phosgene and phenothiazine in the presence of a slight excess of a tertiary base such as pyridine.

The following examples are illustrative of the invention.

Example 1

Sodium (0.2 g.) was dissolved in 1-methyl-3-hydroxypiperidine (34.5 g., 0.3 mole). Ethylene oxide (14.4 g., 0.3 mole) was added and the mixture was heated in a sealed autoclave at 110° C. for twelve hours. Distillation gave recovered starting material, B.P. 66–71°/8 mm., (18.6 g.), and intermediate fraction (4.0 g.) B.P. 73–103°/8 mm., and the product (7.2 g., 15% yield), B.P. 107–111°/8 mm., $n_D^{20}$ 1.4650–1.4675.

A portion of the product was treated with ethereal hydrogen chloride and the salt obtained was recrystallized from isopropanol-ether to furnish the hydrochloride of 1-methyl-3-(hydroxyethoxy)piperidine, M.P. 129–130° C.

Analysis confirmed the empiric formula $C_8H_{18}ClNO_2$.
Required: C, 49.10; H, 9.21; Cl, 18.16; N, 7.16%. Found: C, 49.07; H, 9.17; Cl, 18.03, 18.20; N, 7.58, 7.64%.

Example 2

A solution of the alcohol prepared in Example 1 (8.0 g., 0.05 mole) in an equal volume of dry pyridine was added to a slurry of phenothiazine-10-carboxylic acid chloride (13.1 g., 0.05 mole) in pyridine (25 ml.). The reaction mixture was stirred at room temperature for one hour and subsequently at 87° C. for forty minutes. It was cooled and added to ice-water containing sodium carbonate. The heavy oil which had formed was washed by decantation with several portions of water, taken up in benzene and the solution again washed with water in order to remove the last traces of pyridine. Evaporation left 14.8 g. (77% yield) of product as a brown oil which was clarified by treatment with charcoal in benzene-hexane solution. A sample of this oil was characterized by its U.V. absorption spectrum;

$\lambda$ max. 227 m$\mu$, $E_{1\,cm.}^{1\%}$ 544, $\epsilon$ 22800, and $\lambda$ max. 257, $E_{1\,cm.}^{1\%}$ 213, $\epsilon$ 7960

The compound was 2-[3-(1-methylpiperinoxy)]ethyl phenothiazine-10-carboxylate.

A portion of this base in ether was treated with hydrogen chloride and the resulting salt, an recrystallization from isopropanol-ethanol mixture gave the hydrochloride of 2-[3-(1-methylpiperidinoxy)]ethyl phenothiazine-10-carboxylate, M.P. 226–227° C.

Analysis confirmed the empiric formula $C_{21}H_{25}ClN_2O_3S$.
Required: C, 59.92; H, 5.99; Cl, 8.42; S, 7.62%. Found: C, 59.99; H, 6.20; Cl, 8.28, 8.33; S, 7.43%.

Example 3

A portion of the basic ester described in Example 2 was dissolved in acetone and treated with methyl bromide. The solid was collected and recrystallized from methanol-acetone to give 2-[3-(1-methylpiperidinoxy)]ethyl phenothiazine-10-carboxylate methobromide, M.P. 196–197° C. (decomp.).

Analysis confirmed the empiric formula $$C_{22}H_{27}BrN_2O_3S$$

Required: Br, 16.70; S, 6.68%. Found: Br, 16.77; 16.83; S, 6.58; 6.64%.

I claim:
1. A compound selected from the group which consists of 2-[3-(1-methylpiperidinoxy)]ethyl phenothiazine-10-carboxylate and its hydrochloride and methobromide salts.
2. 2-[3-(1-methylpiperidinoxy)]ethyl phenothiazine-10-carboxylate.

3. The hydrochloride salt of 2-[3-(1-methyl-piperidinoxy)]ethyl phenothiazine-10-carboxylate.

4. The methobromide of 2-[3-(1-methylpiperidinoxy)]ethyl phenothiazine-10-carboxylate.

References Cited in the file of this patent

UNITED STATES PATENTS

| | | |
|---|---|---|
| 2,650,919 | Cusic | Sept. 1, 1953 |
| 2,778,824 | Von Seemann | Jan. 22, 1957 |
| 2,831,862 | Biel | Apr. 22, 1958 |
| 2,831,863 | Biel | Apr. 22, 1958 |
| 2,948,720 | Winthrop | Aug. 9, 1960 |
| 2,976,286 | Schindler et al. | Mar. 21, 1961 |
| 2,980,672 | Weston | Apr. 18, 1961 |

FOREIGN PATENTS

| | | |
|---|---|---|
| 1,173,133 | France | Nov. 17, 1958 |
| 1,036,259 | Germany | Aug. 14, 1958 |

UNITED STATES PATENT OFFICE
CERTIFICATE OF CORRECTION

Patent No. 3,126,379                                        March 24, 1964

Martin A. Davis

It is hereby certified that error appears in the above numbered patent requiring correction and that the said Letters Patent should read as corrected below.

Column 1, line 24, for "which" read -- with --; column 2, line 42, for "(1-methylpiperinoxy)" read -- (1-methylpiperidinoxy) --; line 45, for "an" read -- on --.

Signed and sealed this 15th day of September 1964.

(SEAL)
Attest:

ERNEST W. SWIDER
Attesting Officer

EDWARD J. BRENNER
Commissioner of Patents